United States Patent
Probst (10) Patent No.: US 7,399,176 B2
(45) Date of Patent: Jul. 15, 2008

(54) DEVICE FOR ALIGNING TWO SHELL MOLDS

(75) Inventor: Urs Probst, Zug (CH)

(73) Assignee: Interglass Technology AG, Cham (CH)

( * ) Notice: Subject to any disclaimer, the term of this patent is extended or adjusted under 35 U.S.C. 154(b) by 267 days.

(21) Appl. No.: 10/574,624

(22) PCT Filed: Jun. 21, 2005

(86) PCT No.: PCT/EP2005/052897

§ 371 (c)(1),
(2), (4) Date: Apr. 4, 2006

(87) PCT Pub. No.: WO2006/003099

PCT Pub. Date: Jan. 12, 2006

(65) Prior Publication Data

US 2007/0124919 A1 Jun. 7, 2007

(30) Foreign Application Priority Data

Jul. 2, 2004 (EP) .................................. 04103123

(51) Int. Cl.
*B29D 11/00* (2006.01)
(52) U.S. Cl. ...................... 425/408; 425/395; 425/441; 425/450.1; 425/808; 264/1.1; 264/1.32
(58) Field of Classification Search ................. 425/808, 425/383, 394, 395, 441, 450.1, 451.9, 436 RM, 425/352, 354, 400, 402, 408; 249/162; 264/1.1, 264/1.32, 2.1, 2.5
See application file for complete search history.

(56) References Cited

U.S. PATENT DOCUMENTS 4,895,102 A * 1/1990 Kachel et al. ................ 118/620

(Continued)

FOREIGN PATENT DOCUMENTS

FR 2 794 055 12/2000

(Continued)

OTHER PUBLICATIONS

English Translation of the International Preliminary Report on Patentability for International Application No. PCT/EP2005/052897, date of mailing Feb. 6, 2007.

*Primary Examiner*—James R. Mackey
*Assistant Examiner*—Dimple N. Bodawala
(74) *Attorney, Agent, or Firm*—Thelen Reid Brown Raysman & Steiner LLP; David B. Ritchie (57) ABSTRACT

A device for aligning a first and a second shell mold comprises a first gripper for holding the first shell mold, a second gripper for holding the second shell mold, and a centering station. Both grippers can be displaced relative to one another and relative to the centering station along a predetermined axis and can rotate individually as well as synchronously about the axis. The centering station comprises a supporting body, which supports spring elements arranged along a circle, said axis running through the center of the circle. For centering, the shell mold is moved into the centering station by the gripper and then removed from the gripper so that the shell mold is held solely by the spring elements. The radial forces of the spring elements uniformly acting upon the shell mold from all sides cause the shell mold to be displaced into the center of gravity of the forces. Afterwards, the shell mold is gripped once again by the gripper and moved out from the centering station.

20 Claims, 5 Drawing Sheets

U.S. PATENT DOCUMENTS

| | | | |
|---|---|---|---|
| 5,178,801 A | | 1/1993 | Shimizu et al. |
| 5,415,817 A | * | 5/1995 | Shiao et al. ................... 264/2.2 |
| 6,068,464 A | * | 5/2000 | Su et al. ..................... 425/190 |
| 6,071,112 A | * | 6/2000 | Calvin et al. ................ 425/445 |
| 6,103,148 A | * | 8/2000 | Su et al. .................... 264/1.38 |
| 6,439,870 B1 | * | 8/2002 | Marceau et al. ............. 425/111 |
| 6,821,461 B1 | | 11/2004 | Bessiere et al. |
| 6,929,233 B2 | * | 8/2005 | Andin et al. ................ 249/109 |
| 6,994,538 B2 | * | 2/2006 | Haidl et al. .................. 425/180 |
| 2007/0052117 A1 | * | 3/2007 | Arnet et al. ................... 264/1.1 |

FOREIGN PATENT DOCUMENTS

| | | |
|---|---|---|
| GB | 2 227 969 | 8/1990 |
| WO | 00/56528 | 9/2000 |
| WO | WO 2087861 A2 * | 11/2002 |

* cited by examiner

DEVICE FOR ALIGNING TWO SHELL MOLDS

CROSS REFERENCE TO RELATED APPLICATIONS

The present application is related to and claims priority of the PCT application number PCT/EP2005/052897 entitled Device for aligning two shell molds, filed Jun. 21, 2005, the disclosure of which is herein incorporated by reference, which in turn claims priority of the European patent application No. 04103123.8 filed Jul. 2, 2004.

TECHNICAL FIELD

The invention concerns a device for aligning two shell molds.

TECHNICAL BACKGROUND

Such shell molds are used for the manufacture of optical lenses. In doing so, a monomer is cast in a cavity bordered by two shell molds and a seal and then polymerised, whereby the lens is produced. From U.S. Pat. No. 5,178,801 it is known to center a front shell mold and a rear shell mold in one centering device each, then to arrange them at a predefined distance on a common axis and to join them together into a composite by means of a tape. In the centering devices, the optical axes of the shell molds are aligned. The centering devices consist of two centering plates each with two V-shaped limbs the inside edges of which run diagonally to one another. On centering the shell mold, the two centering plates are pushed together and, in doing so, the shell mold is aligned on the inside edges of the limbs. The disadvantage with this device is that the centering device is overdetermined because the position of a shell mold is determined by means of four contact points although three contact points would be sufficient. A further disadvantage is that, after centering, the shell molds have to be transported and aligned on a common axis before they can be joined together with the tape.

BRIEF DESCRIPTION OF THE INVENTION

An object of the invention is to develop a device for the mutual alignment and positioning of two shell molds that enables high centering accuracy.

The device in accordance with the invention comprises a first gripper for holding the first shell mold and a second gripper for holding the second shell mold and a centering station. The two grippers can be moved relative to each other and relative to the centering station along a predetermined axis and can be rotated individually as well as synchronously on the axis. The centering station consists of a supporting body that supports at least one spring element arranged along a circle whereby the axis runs through the center of the circle. For centering, the shell mold is moved into the centering station by the gripper whereby the spring element or spring elements are deflected or deformed depending on their actual structure and then released from the gripper so that the shell mold is only held by the spring element or spring elements. The radial forces from the spring element or spring elements acting uniformly on the shell mold from all sides have the effect that the shell mold is moved into the force center of gravity so that it is centered in relation to the axis. The shell mold is then grasped again by the gripper and moved out of the centering station. The device in accordance with the invention has the advantage that the two grippers have the centering axis of the centering station as common axis.

In accordance with a first embodiment, the supporting body is a body with a wall that forms a circular opening through the center of which the axis runs. The wall has a groove. An O-ring, a cord, a tube or a thing like that made of elastically deformable material is inserted into the groove. With this example, the groove is circular and supports the O-ring, cord or tube uniformly along the circle. With O-ring, is meant a conventional, closed O-ring as well as a cut O-ring that one could refer to as round cord. One can consider the O-ring, the cord or the tube as one single spring element or also as a number of spring elements that continuously merge. The O-ring or the round cord touches the shell mold along its perimeter and the radial forces acting uniformly on the shell mold from all sides have the effect that the center of the shell mold moves into the force center of gravity.

When a tube is used, if necessary the diameter and/or the firmness of the tube can be increased by applying compressed air to the tube. To move the shell mold in and out, the compressed air is evacuated from the tube in order to reduce the friction between the shell mold and the tube. For centering, compressed air is applied to the tube.

The groove can have several recesses. Centering of the shell mold is then no longer done uniformly from all sides but only from those areas where the groove is not recessed. With this design, only part of the O-ring, cord or tube forms the spring element, namely the part that can not escape into the recess.

With a different embodiment the supporting body is a ring and a number of spring elements are formed by means of spring tongues that are arranged next to each other along the opening of the ring. The ring and the tongues are preferably produced from one piece of material that has similar mechanical characteristics to spring steel. On moving the shell mold in, the tongues are deflected out of their neutral position and therefore exert a force against the edge of the shell mold. As soon as the shell mold is released from the gripper, an equalisation of the forces produced by the individual tongues takes place: The shell mold is moved to the center of gravity of the forces.

The core of the invention exists on the one hand in the presented nature of the centering station and, on the other hand in that the two grippers can be moved along a predetermined axis and can be rotated on this axis. Constructively, the linear movements of the two grippers and their rotary movements can be achieved in various ways.

With a particularly advantageous solution, the device comprises a first motor for moving the first gripper along a predetermined axis, a second motor for moving the second gripper along the axis, a third motor for rotating the first gripper on the axis and a fourth motor for rotating the second gripper on the axis and the centering station is arranged stationary. The axis penetrates the center of the circle of the centering station. The axis is therefore the centering axis of the centering station. The first gripper and the second gripper preferably bear relocatably on a common guide rail that runs parallel to the axis.

On the other hand, it is also possible to place one of the grippers stationary and to arrange only the other gripper and the centering station relocatably along the axis. As it is only a matter of a relative movement between the two grippers as well as the centering station, it is irrelevant which of these units can be moved. Preferably the centering station is arranged stationary and the two grippers movably. However, a construction is also possible with which for example one of the grippers is stationary and the second gripper and the centering station are relocatable.

The two shell molds are centered by means of the centering station and their mutual rotational position and their distance is adjusted corresponding to the lens recipe by means of moving and rotating the two grippers. The two shell molds are then aligned and are joined together into a composite by means of a sealing element.

Preferably, an adhesive tape known in the art as a tape serves as the sealing element. The tape is an element joining the two shell molds that on the one hand has a low rigidity so that it can easily be stuck to the two shell molds and on the other hand is sufficiently rigid so that the composite formed is adequately stable. The tape ensures that the alignment of the shell molds relative to each other does not change or only changes negligibly when the composite is transported to the filling station where the lens is produced by casting a monomer.

Alternatively, it is possible to use any other sealing element in order to form a cavity between the two shell molds that can be filled with the monomer. The sealing element can for example be a ring made of rubber that is placed around the two shell molds. In this case, the monomer is preferably poured in on the spot.

In the following, the invention is explained in more detail based on embodiments and based on the drawing.

DETAILED DESCRIPTION OF THE INVENTION

Figure 1:
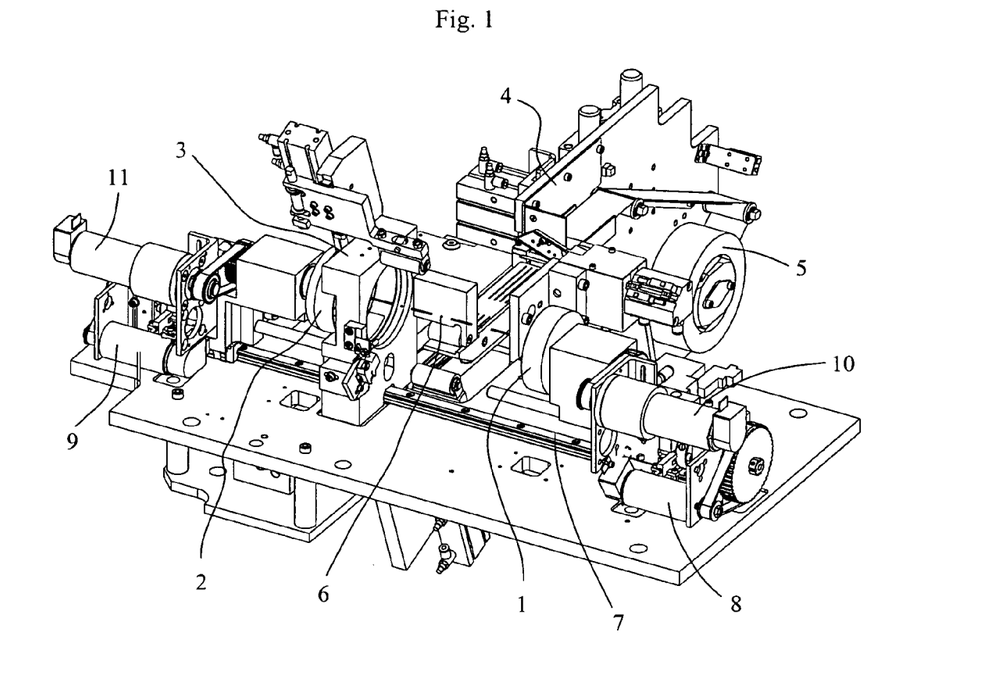
FIG. 1 shows a device for aligning two shell molds and for forming a composite out of the shell molds and a tape including a device for applying the tape.
Figure 2:
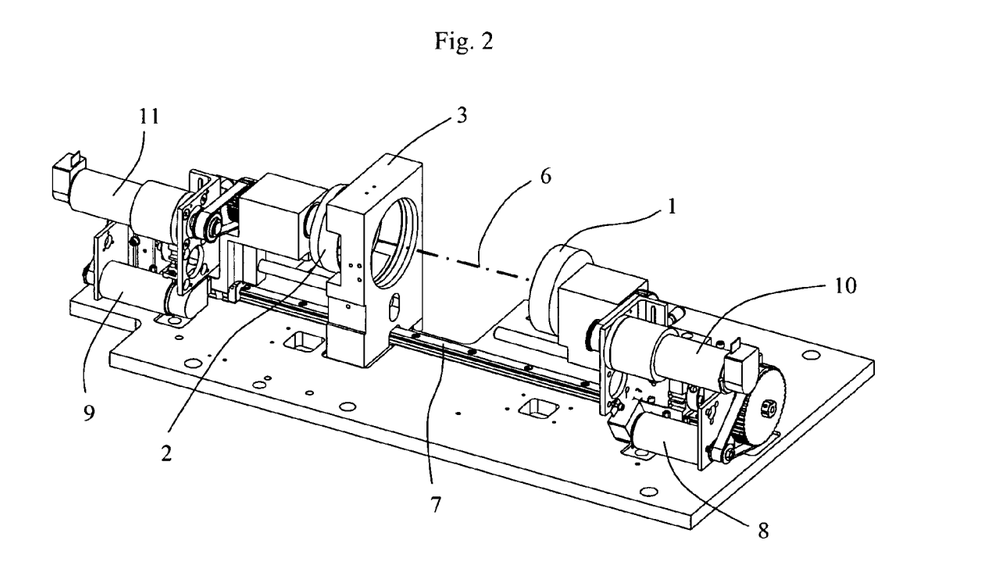
FIG. 2 shows the device according to FIG. 1 without the device for applying the tape.

FIGS. 1 and 2 show a perspective view of a device that serves to align the optical axes of a first shell mold (see ref. No. 27 in FIG. 9) and a second shell mold (also see ref. No. 27 in FIG. 9) relative to each other and to position them at a predetermined distance and then to join them together into a composite by means of sticking a tape along the edge of the two shell molds. FIG. 1 shows the entire device with the device for applying the tape. FIG. 2 shows the same device for reasons of illustrative clarity without the device for applying the tape. The device comprises a gripper 1 for holding the first shell mold, a gripper 2 for holding the second shell mold, a centering station 3 and a device 4 for feeding and applying the tape 5. The two grippers 1 and 2 can be moved along a predetermined axis 6 and can be rotated on the axis 6 individually as well as together. The two grippers 1 and 2 preferably bear on a common guide rail 7. The axis 6 runs parallel to the guide rail 7. A first motor 8 serves to move the first gripper 1 along the guide rail 7, a second motor 9 serves to move the second gripper 2 along the guide rail 7, a third motor 10 serves to rotate the first gripper 1 on the axis 6, a fourth motor 11 serves to rotate the second gripper 2 on the axis 6. The centering station 3 that is arranged stationary in this example serves to align the axis of symmetry or the optical axis of a shell mold so that it coincides with the axis 6. Each of the two shell molds has a marking (a so-called tabo marking) on its edge that characterizes the rotational position of the shell mold. The motors 8 to 11 and the device 4 for applying the tape 5 are controlled by a control device.

Figure 3:
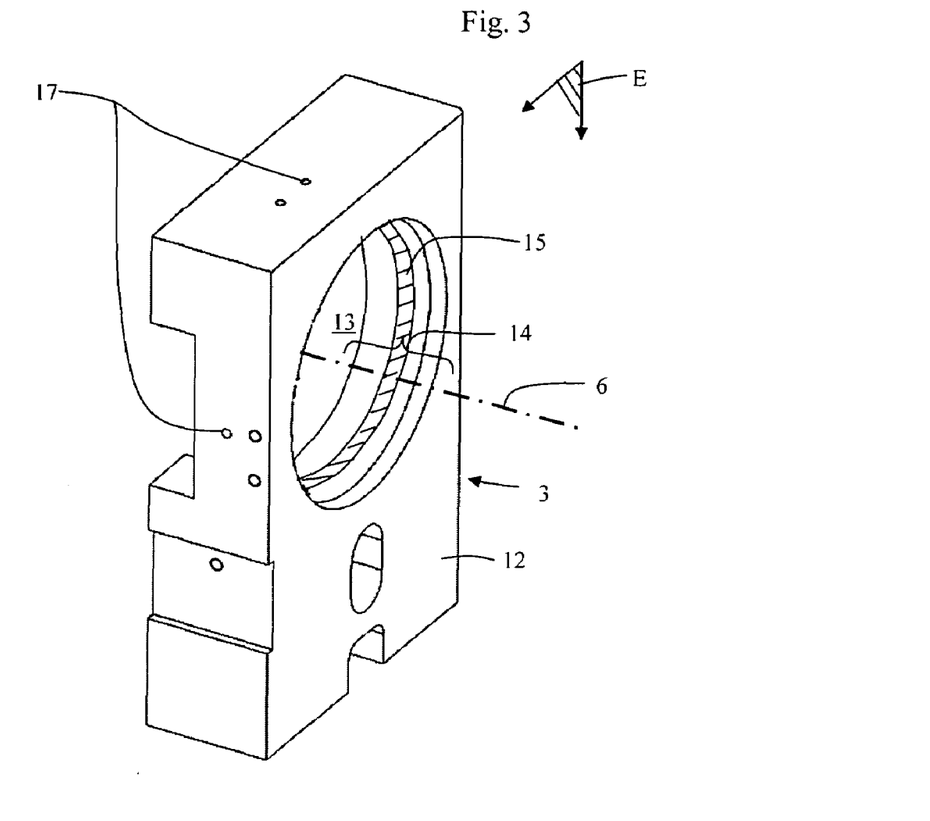
FIG. 3 shows a centering station for adjusting the optical axes of the shell molds.
Figure 4:
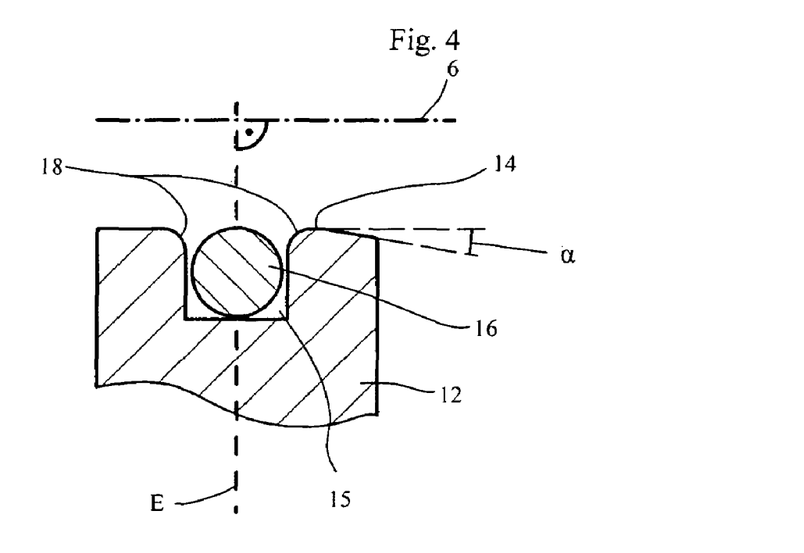
FIG. 4 shows a cross-section of a centering station with an O-ring.

FIG. 3 shows a detailed perspective view of the centering station 3. The centering station 3 consists of a body 12 with a circular opening 13 that is formed by a wall 14. The wall 14 contains a groove 15 into which an O-ring 16 is inserted (FIG. 4). The groove 15 supports the O-ring 16. The O-ring 16 is made of elastically deformable material, for example rubber or any other elastomer. The groove 15 lies in a plane E aligned orthogonal to the axis 6 and the body 12 is positioned and adjusted relative to the axis 6 so that the center of the circular opening 13 lies on the axis 6. In order to center a shell mold, the shell mold is pushed into the centering station 3 by the corresponding gripper 1 or 2 until it is held firmly by the O-ring 16. The gripper is then temporarily released from the shell mold so that the shell mold is only held by the O-ring 16. The radial forces from the O-ring 16 acting uniformly on the shell mold from all sides have the effect that the shell mold is moved to the force center of gravity, i.e. the shell mold is centered and in the ideal case its optical axis coincides with the axis 6. Afterwards, the shell mold is again grasped by the gripper.

The diameter of the groove 15 or the O-ring 16 is dimensioned so that on introducing a shell mold into the centering station 3, the O-ring 16 is compressed. The inside diameter of the O-ring 16 is therefore in any case less than the smallest expected diameter of the shell mold. The amount of the difference between the diameter of the shell mold and the inside diameter of the O-ring 16 influences the strength of the radial and axial acting forces. The greater this difference, the greater the forces aligned in axial direction and therefore also the friction acting between the O-ring 16 and the shell mold when introducing the shell mold.

In order to eliminate the influence of unavoidable tolerances of the inner diameter of the O-ring 16, it is advantageous to cut the O-ring 16, i.e. transform the O-ring 16 into a round cord. The length of the round cord is somewhat less than the circumference of the groove 15 so that the round cord can easily be inserted into the groove 15. The point of discontinuity created is small in relation to the circumference and does not or only negligibly influences the centering of the shell molds. The decisive inside diameter of the round cord inserted into the groove 15 is determined by the circumference of the groove 15 and the diameter of the round cord. With the term O-ring 16 is meant a closed O-ring 16 as well as an O-ring 16 cut into the round cord.

The body 12 preferably has at least one drill hole 17 that opens out into the groove 15. The drill hole 17 serves to easily remove the O-ring 16 from the body 12 in order to exchange it.

FIG. 4 shows a cross-section of the wall 14 with the groove 15 into which the O-ring 16 is inserted. The groove 15 has rounded edges 18 in order to avoid the O-ring 16 being damaged on the edges 18 when the shell mold is moved in and out. The wall 14 is preferably bevelled on the side facing towards the device 4 (FIG. 1) for applying the tape 5, i.e. an outer area runs at an angle α diagonally to the axis 6 so that a precentering on the wall 14 already takes place on inserting the shell mold in case the shell mold exceeds a certain degree of eccentric alignment on the gripper.

Figure 5:
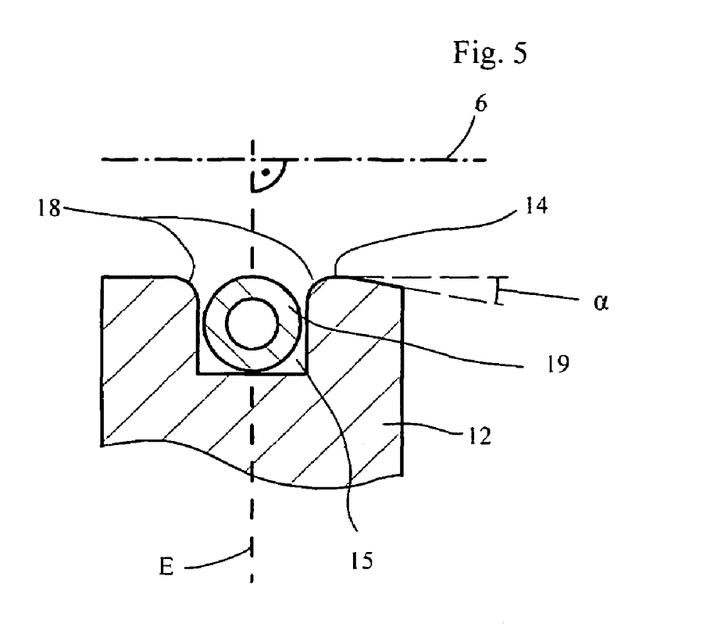
FIG. 5 shows a cross-section of a centering station with a tube.

FIG. 5 shows a cross-section of the wall 14 with the groove 15 in which a tube 19 is inserted instead of the O-ring. Optionally, compressed air can be applied to the tube 19.

Figure 6:
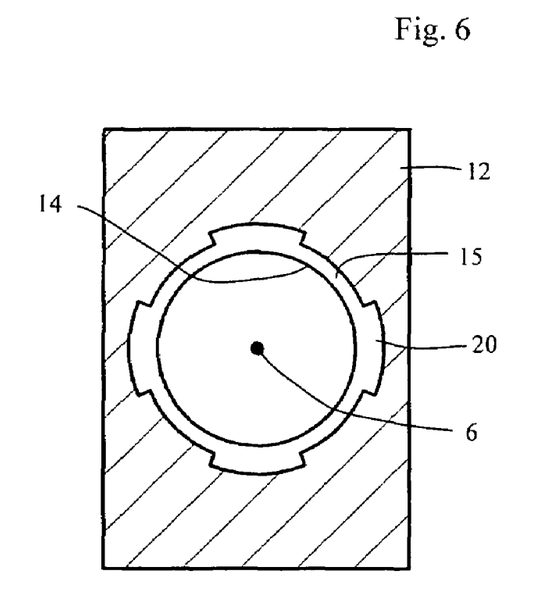
FIG. 6 shows a detail of the centering station.
Figure 7:
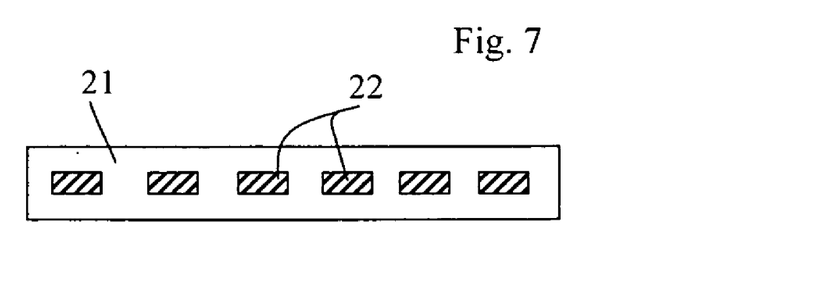
FIG. 7 shows a carrier with several spring elements.

FIG. 6 shows a section of the body 12 perpendicular to the axis 6 (FIG. 1) running through the groove 15, i.e. through the plane E. The groove 15 has several recesses 20. The recesses 20 enable the O-ring 16 or the tube 19 to escape locally when the shell mold is inserted. This reduces the frictional forces. Centering of the shell mold is then only done by means of those areas of the groove 15 where no recesses 20 are present. Another solution exists in cutting an O-ring into pieces and to stick some of the pieces at a distance to one another onto a carrier and then to insert the carrier into the groove 15 of the body 12. FIG. 7 shows a plan view of such a carrier 21 with pieces 22 made of elastically deformable material stuck onto it that form separate spring elements.

Figure 8:
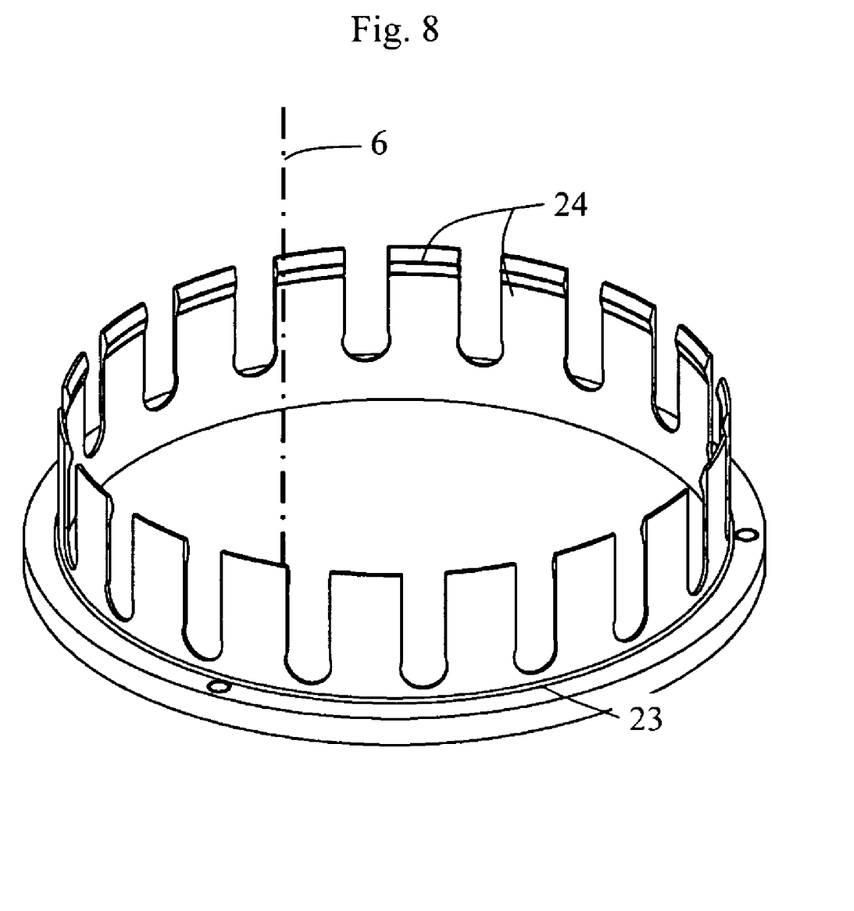
FIG. 8 shows a ring with spring elements.

FIG. 8 shows a ring 23 with a plurality of spring elements formed as tongues 24. The ring 23 consists of a material with mechanical characteristics similar to spring steel. The ring 23 is inserted into the opening 13 of the body 12 (FIG. 3). On inserting the shell mold, the tongues 24 are deflected perpendicular to their longitudinal direction or perpendicular to the centering axis 6. The dimensions of the ring 23 and the opening 13 in the body 12 are adapted to each other so that the tongues 24 do not touch the wall 14 or only touch it when the deflection of the tongues 24 reaches a certain degree.

One advantage of the solution with the ring 23 in comparison with the solution with the O-ring 16 exists in the lower frictional forces on inserting the shell mold into the centering station 3 (FIG. 1) and in reduced wear of the ring.

The two embodiments for the spring elements can be combined.

The two grippers 1 and 2 are constructed the same. The construction of the grippers is described in more detail based on FIG. 9. The gripper contains a support 25 on which the passive side 26 of the shell mold 27 comes to rest, as well as a circular, deformable sealing element 28 arranged within the support 25 in order to seal a cavity 29 formed between the shell mold 27 and the gripper to which vacuum can be applied. The support 25 is located in a plane running perpendicular to an axis of symmetry 30. The surface of the support 25 facing towards the shell mold 27 is toroidal. The sealing element 28 is secured to a plate 31 that is connected by means of a path absorbing element, preferably a bellows 32, to a platform 33 carrying the support 25. The bellows 32 enables a relatively large deflection of the sealing element along the axis of symmetry 30 of the gripper as well as a shifting within the interior bordered by the torus of the support 25, in order to be able to grasp shell molds of different geometry. The axis of symmetry 30 corresponds to the axis of rotation of the gripper and therefore the axis 6 (FIG. 1). When the gripper has not grasped a shell mold, then the bellows 32 assumes its neutral position and the sealing element 28 protrudes typically by several millimetres above the edge of the support 25.

Figure 9:
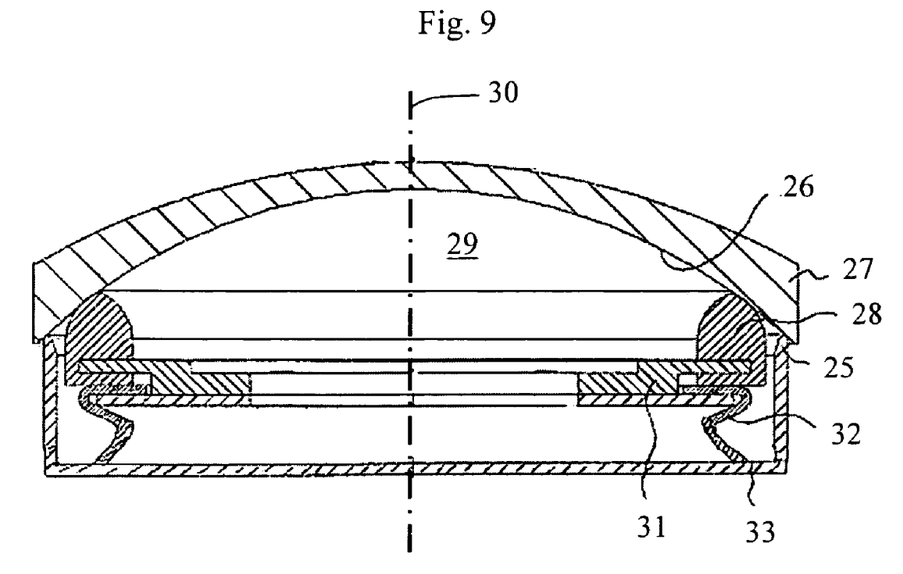
FIG. 9 shows a gripper.

The principle of operation of the workstation (FIG. 1) is now explained based on the example of a centering station 3 that contains an O-ring 16 as the spring element:

A not presented robot or an operator passes the first shell mold to the first gripper 1. In doing so, the bellows 32 are compressed until the first shell mold comes to rest on the support 25 of the first gripper 1. Vacuum is applied to the cavity formed between the first gripper 1 and the shell mold.

The first motor 8 moves the first gripper 1 along the axis 6 until the first shell mold is located in the centering station 3. When the first shell mold is already pretty well correctly centered then, on moving into the centering station 3, it only touches the O-ring 16. On the other hand, when the first shell mold is centered inaccurately then, on moving into the centering station 3, it comes into contact with the bevelled wall 14 and in doing so is precentered, i.e. the first shell mold is shifted on the support 25 so that the degree of centering relative to the axis 6 is increased. In doing so, the sealing element 28 can be further deformed.

The vacuum in the cavity 29 between the first shell mold and the first gripper 1 is released and the first gripper 1 is moved back until the gripper 1 is separated from the first shell mold. At the side of the first gripper 1 any deformation of the sealing element 28 and the bellows 32 disappears: The sealing element 28 and the bellows 32 assume their neutral position. The first shell mold is now only held by the O-ring 16 of the centering station 3. The radial forces from the O-ring 16 acting uniformly on the shell mold from all sides have the effect that the shell mold is moved to the force center of gravity. The shell mold is now centered.

The first gripper 1 is again moved to the first shell mold until the shell mold again rests on the support 25 and vacuum is again applied to the resealed cavity 29.

The first gripper 1 is moved out of the centering station 3 together with the shell mold.

The third motor 10 rotates the first gripper 1 on the axis 6 until the marking of the first shell mold assumes a predetermined angle of rotation θ1.

The second gripper 2 is moved through the centering station 3.

The robot passes the second shell mold to the second gripper 2.

Centering of the second shell mold now takes place in a similar way in that the second gripper 2 moves the second shell mold into the centering station 3, is temporarily released from the second shell mold so that the shell mold centers itself, grasps the shell mold again and moves in the direction of the device 4 for feeding and applying the tape 5.

The fourth motor 11 rotates the second gripper 2 on the axis 6 until the marking of the second shell mold assumes a predetermined angle of rotation θ2. The angles of rotation of the two shell molds are now adjusted relative to each other corresponding to the lens recipe.

The two grippers 1 and 2 are positioned at a distance to each other corresponding to the lens recipe. The two shell molds are now centered and aligned relative to one another.

A press roller of the device 4 now presses the end of the tape 5 onto the edges of the two shell molds. The motors 10 and 11 rotate the two grippers 1 and 2 synchronously on the axis 6, whereby the tape running underneath the press roller is applied to the edges of the two rotating shell molds and is finally cut off. In this way, the two shell molds are joined together into a composite by means of the tape.

The second gripper 2 is released from the shell mold and moved away. The composite is now taken over by a robot or an operator that transports the composite to a filling station where a monomer is poured into the cavity bordered by the two shell molds and the tape.

The device described enables the fully automatic centering and alignment of the two shell molds and the joining of the shell molds into a composite with a tape.

The same device but without the device 4 (FIG. 1) for applying the tape can also be used in order to mutually align the two shell molds and then to join them with a different sealing element into a composite containing the cavity for the lens.

What is claimed is:

1. A device for aligning a first and a second shell mold, the device comprising:
   a centering station comprising at least one spring element embracing a circular opening;
   a first gripper for holding the first shell mold; and
   a second gripper for holding the second shell mold,
   wherein the first gripper and the second gripper are movable relative to each other and relative to the centering station along a predetermined axis and rotatable individually as well as synchronously on said axis, and wherein said axis runs through a center of the circular opening of the centering station.

2. The device according to claim 1, wherein the centering station has a body with a wall that forms the circular opening and has a groove, and wherein the at least one spring element is a closed or cut O-ring or a tube made of elastically deformable material that is inserted in the groove.

3. The device according to claim 1, wherein the first gripper and the second gripper bear on a common guide rail.

4. The device according to claim 2, wherein the first gripper and the second gripper bear on a common guide rail.

5. The device according to claim 1, further comprising;
a first motor for moving the first gripper along said axis;
a second motor for moving the second gripper along said axis;
a third motor for rotating the first gripper on said axis; and
a fourth motor for rotating the second gripper on said axis.

6. The device according to claim 2, further comprising:
a first motor for moving the first gripper along said axis;
a second motor for moving the second gripper along said axis;
a third motor for rotating the first gripper on said axis; and
a fourth motor for rotating the second gripper on said axis.

7. The device according to claim 3, further comprising:
a first motor for moving the first gripper along said axis;
a second motor for moving the second gripper along said axis;
a third motor for rotating the first gripper on said axis; and
a fourth motor for rotating the second gripper on said axis.

8. The device according to claim 4, further comprising:
a first motor for moving the first gripper along said axis;
a second motor for moving the second gripper along said axis;
a third motor for rotating the first gripper on said axis; and
a fourth motor for rotating the second gripper on said axis.

9. The device according to claim 1, further comprising:
a device for applying a tape in order to join the two shell molds into a composite.

10. The device according to claim 2, further comprising:
a device for applying a tape in order to join the two shell molds into a composite.

11. The device according to claim 3, further comprising:
a device for applying a tape in order to join the two shell molds into a composite.

12. The device according to claim 4, further comprising:
a device for applying a tape in order to join the two shell molds into a composite.

13. The device according to claim 1, wherein the first gripper and the second gripper comprise a support, a sealing element arranged within the support to seal a cavity formed between the gripper and the shell mold, and a path absorbing element that enables deflection of the sealing element along said axis.

14. The device according to claim 2, wherein the first gripper and the second gripper comprise a support, a sealing element arranged within the support to seal a cavity formed between the gripper and the shell mold, and a path absorbing element that enables deflection of the sealing element along said axis.

15. The device according to claim 3, wherein the first gripper and the second gripper comprise a support, a sealing element arranged within the support to seal a cavity formed between the gripper and the shell mold, and a path absorbing element that enables deflection of the sealing element along said axis.

16. The device according to claim 4, wherein the first gripper and the second gripper comprise a support, a sealing element arranged within the support to seal a cavity formed between the gripper and the shell mold, and a path absorbing element that enables deflection of the sealing element along said axis.

17. The device according to claim 9, wherein the first gripper and the second gripper comprise a support, a sealing element arranged within the support to seal a cavity formed between the gripper and the shell mold, and a path absorbing element that enables deflection of the sealing element along said axis.

18. The device according to claim 10, wherein the first gripper and the second gripper comprise a support, a sealing element arranged within the support to seal a cavity formed between the gripper and the shell mold, and a path absorbing element that enables deflection of the sealing element along said axis.

19. The device according to claim 11, wherein the first gripper and the second gripper comprise a support, a sealing element arranged within the support to seal a cavity formed between the gripper and the shell mold, and a path absorbing element that enables deflection of the sealing element along said axis.

20. The device according to claim 1, wherein said at least one spring element is a plurality of spring elements formed as tongues that are arranged on a ring.

* * * * *